(12) United States Patent
Sherman, II

(10) Patent No.: US 6,679,354 B1
(45) Date of Patent: Jan. 20, 2004

(54) ACTUATOR MECHANISM FOR DRUM IN HAT BRAKE

(75) Inventor: William Eugene Sherman, II, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/352,492

(22) Filed: Jan. 28, 2003

(51) Int. Cl.$^7$ ................................................ F16D 65/14
(52) U.S. Cl. .................................. 188/2 D; 188/106 A
(58) Field of Search .............................. 188/2 D, 70 R, 188/106 A, 106 F, 78, 325–341

(56) References Cited

U.S. PATENT DOCUMENTS

| | | | | |
|---|---|---|---|---|
| 5,180,037 A | * | 1/1993 | Evans | 188/70 R |
| 6,325,183 B2 | * | 12/2001 | Kurihara | 188/78 |
| 6,502,670 B1 | * | 1/2003 | Asai | 188/2 D |
| 6,581,729 B1 | * | 6/2003 | Moriwaki | 188/2 D |

* cited by examiner

Primary Examiner—Christopher P. Schwartz
(74) Attorney, Agent, or Firm—Leo H McCormick, Jr.; Warren Comstock

(57) ABSTRACT

An actuator mechanism in a drum-in-hat park brake having a housing with a first end that engages a first web of a first brake shoe and a second end that engages a second web of a second brake shoe. A lever pivotally retained in the housing has a first end that engages the first web and a second end with a hook thereon for receiving a loop end of a linkage connected to an input member. On receipt of an input force the lever pivots and exert an actuation force on the first and second webs to correspondingly moves first and second friction members associated with the first and second brake shoes into engagement with a drum to effect a brake application. The actuator mechanism is characterized in that the lever has a projection located between the hook and the first end, a notch that is perpendicular to a longitudinal axis of the lever and located on an edge of the projection, and a detent in a surface of the hook and by a clip member having a first portion initially located in the notch and a second portion initially located in the detent. An initial input force applied by the loop brings the loop end into engagement with the second portion and moves a lip on the second portion out of the detent and along the slot while the first portion correspondingly moves out of the notch such that when the loop end reaches the bottom of the throat of the hook, the lip snaps into the hole and a third portion of the clip is aligned with a tip of the hook to retain the loop end in the hook.

15 Claims, 4 Drawing Sheets

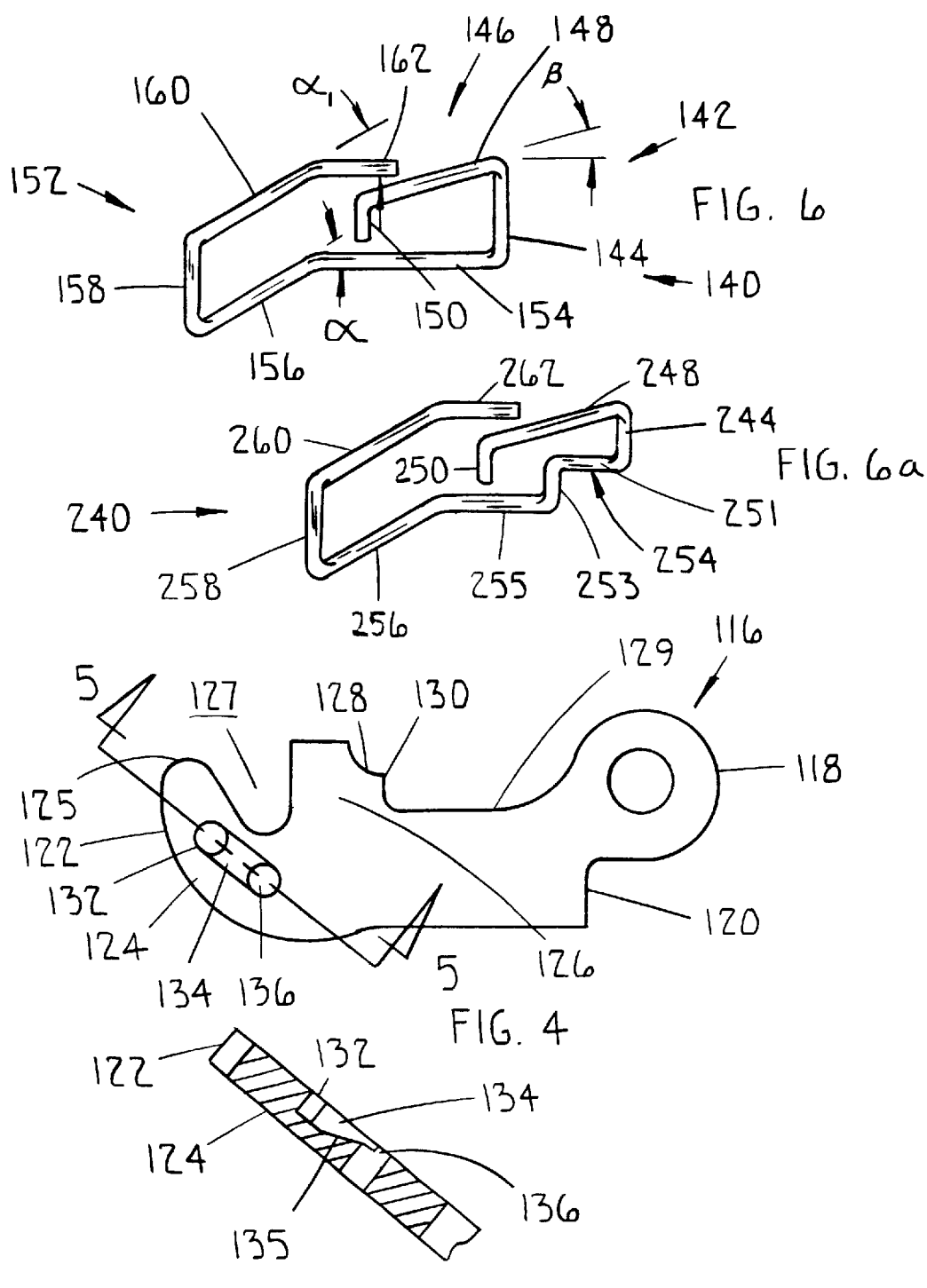

US 6,679,354 B1

ACTUATOR MECHANISM FOR DRUM IN HAT BRAKE

This invention relates to an actuator mechanism for a drum-in-hat park brake in a vehicle.

BACKGROUND OF THE INVENTION

In a vehicle having four wheel disc brakes, an overall cost saving may be achieved through the use of a drum-in-hat parking brake such as disclosed in U.S. Pat. No. 5,180,037 as many of the structural components for a conventional service brake may be used in such a parking brake. A study of parking brakes revealed that less than twenty five precent of drivers effect a parking brake application on a regular basis and the use of a parking brake was even less in vehicles having an automatic transmissions. With such limited use, an initial thickness of the material of friction members for a parking brake remains essentially the same over the life of a vehicle in spite of a relative large coefficient of friction required between the friction pads and drum needed to hold a vehicle stationary in accordance with safety standards. The coefficient of friction for a friction lining for a parking brake is derived from a composition of materials mainly consisting of metal oxides, ceramic particles, carbon particles, fibers and other materials retained in a phenolic matrix. The relative limited wear is not unexpected, as a vehicle is normally stationary when a parking brake application is applied and as a result rotational frictional wear normally does not occur. However, current safety standards now require a park brake to also be capable of functioning as an emergency brake and have an ability to capable of achieving a minimum of six rolling stops from a speed of 18.6 miles per hour. In order to meet this requirement, it is not uncommon for an actuation force of approximately 100 Kg to be applied to bring brake shoes into engagement with a drum to effect such a brake application.

A drum-in-hat parking brake is commonly assembled at a first location by a first manufacturer and later installed on a vehicle at a second location by a vehicle manufacturer. At the second location, a brake cable is connection to the actuation lever in the parking brake such as disclosed in U.S. Pat. Nos. 5,174,170, 6,234,281 or U.S. patent application Ser. No. 10/171,142 filed Jun. 13, 2002. It may be difficult and time consuming for some vehicle manufacturers to install a brake cable to the lever of an actuator mechanism on an assembly line as such assembly is essentially a blind entry, it has been suggested that a stub linkage be provided with a drum-in-hat assembly the end thereof later joined to a brake cable by a crimp connection such as disclosed in U.S. Pat. No. 10/323,321 filed Dec. 18, 2002. This type connection functions in an adequate manner but lacks a positive lock between the lever and the stub linkage.

SUMMARY OF THE INVENTION

A primary object of the present invention is to provide a clip for locking a loop on a cable with a hook on a lever of an actuator in a drum-in-hat park brake.

According to this invention, an actuator mechanism for a drum-in-hat park brake in a vehicle has a housing with a first end that engages a first web of a first brake shoe and a second end that engages a second web of a second brake shoe. A lever that is pivotally retained in the housing has a first end that engages the first web and a second end with a hook thereon for receiving a loop end of a cable connected to an input member. The cable receives and transmits an input force to the loop end that causes the lever to pivot and exert an actuation force on the first and second webs to correspondingly move first and second friction members associated with the first and second brake shoes into engagement with a drum to effect a brake application. The actuator mechanism is characterized in that the lever has a projection located between the hook and the first end, a notch located on an edge of the projection that is perpendicular to a longitudinal axis of the lever, and a detent in a surface on the hook. A contiguous wire formed clip member is retained on the lever such that a first portion or segment is initially located in the notch, a second portion or segment with a lip of an arm is initially located in the detent and a third portion or segment that extends from the first portion is positioned adjacent the hook. On installation of the loop end of the cable in the actuator housing, the loop end engages the third segment and is guided toward the hook and on an installation force being applied to the cable, the loop responds by moving into the throat of the hook and into engagement with the arm. As the installation force continues to be applied to move the loop end to the bottom of the throat, the loop correspondingly acts on the arm to move the lip out of the detent and into a hole in the lever while at the same time the first segment moves out of the notch such that when the loop reaches the bottom of the throat of the hook, the lip snaps into the hole and the third portion or segment of the clip is aligned with a tip of the hook to retain the loop end in the hook.

An advantage of this invention resides in a simple wire formed clip that initially guides a loop end of a cable into a throat of a hook on a lever of an actuator for a drum-in-hat brake assembly and later locks the loop end to the hook.

BRIEF DESCRIPTION OF THE DRAWINGS

FIG. 4 is a plan view of the lever for use in the actuator mechanism of FIG. 2;

FIG. 5 is a sectional view taken along lines 5—5 of FIG. 4;

FIG. 6 is perspective view of the clip member for use in the actuator mechanism of FIG. 2;

FIG. 6a is a perspective view of an alternate clip member for use in the actuator mechanism of FIG. 2;

DETAILED DESCRIPTION

Figure 1:
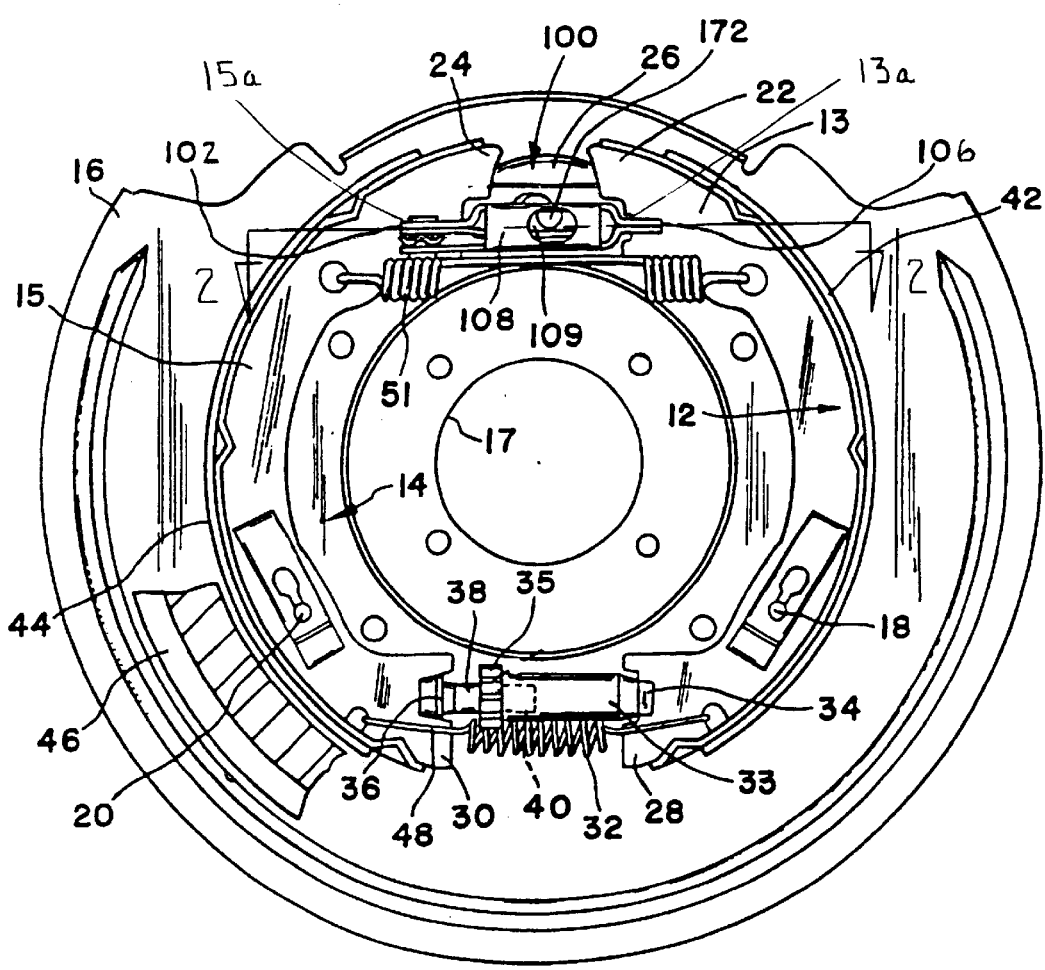
FIG. 1 is a schematic illustration of a drum-in-hat brake for a vehicle having an actuator mechanism, made according to the present invention, for moving first and second brake shoes into engagement with a drum to effect a brake application.

The drum-in-hat brake 10 shown in FIG. 1 for use in a vehicle includes an actuator mechanism 100 for effecting a park brake application. The drum-in-hat brake 10 is of a general type as disclosed in U.S. Pat. No. 6,234,281 and includes a backing plate 16 that is fixed by bolts to a vehicle. The backing plate 16 which has an opening 17 for receiving an axle shaft of the vehicle accepts first 18 and second 20 pins to correspondingly retain first 12 and second 14 brake shoes in radial alignment with brake drum 46. Brake shoe 12 has a first end 22 and brake shoe 14 has a first end 24 that, respectively, contact an anchor block 26 that extends through the backing plate 16 on a stationary member in the vehicle. Further, brake shoe 12 has a second end 28 and brake shoe 14 has a second end 30 that, respectively, contact an adjuster strut mechanism 32. The strut mechanism 32 is of a type disclosed in U.S. Pat. Nos. 4,502,574 and 5,480,010 that links web 13 on brake shoe 12 with web 15 on brake shoe 14 in such a manner that a force experienced on engagement of either brake shoe 12,14 with drum 46 is directly communicated to the other.

The length of the strut mechanism 32 may be altered by rotating star wheel 35 on stem 38 with respect to cylinder 33 to establish and maintain a predetermined running clearance between a first friction pad 42 on brake shoe 12 and a second friction pad 44 on brake shoe 14 and the drum 46. The first brake shoe 12 is urged toward the second brake shoe 14 by a resilient arrangement that includes a first spring 51 that urges the first ends 22,24 toward the anchor post 26 and a second spring 48 that urges the second ends 28,30 toward the adjuster strut mechanism 32.

Figure 3:
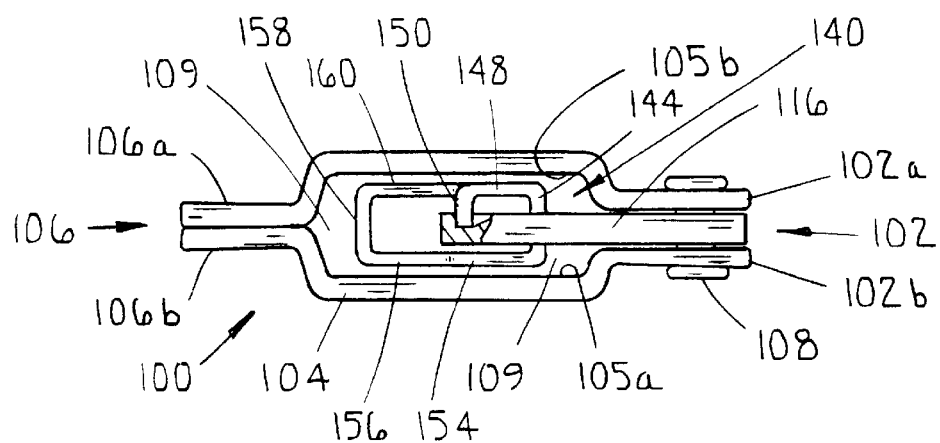
FIG. 3 is a view of the actuator mechanism taken along lines 3—3 of FIG. 2.
Figure 2:
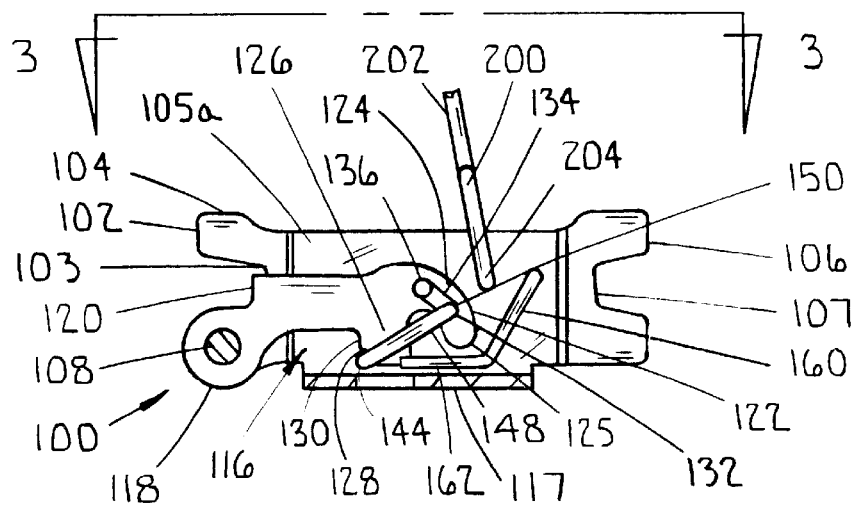
FIG. 2 is an sectional view taken along lines 2—2 of FIG. 1 showing a clip member joined to a lever in the actuator mechanism.

An actuator mechanism 100 according to the present invention is located adjacent the anchor post 26 for moving the first brake shoe 12 toward drum 46 and the second brake shoe 14 toward drum 46 to effect a park brake application. Actuator mechanism 100, as best illustrated in FIGS. 2 and 3, includes a housing 104 with first end 102 that engages web 15 and a second end 106 end that engages web 13. End 102 is located on a ledge 15*a* in web 15 and end 106 is located on a ledge 13*a* in web 13 and have a length there between such that when the first ends 22,24 of brake shoes 12 and 14 engage anchor 26, ends 102 and 106 also engage corresponding the bottom of ledges 13*a* and 15*a* on webs 13,15.

A lever 116 of actuator mechanism 100, as best shown in FIG. 4, is pivotally located in housing 104 by a pin 108. Lever 116 has a first end 118 with a shoulder 120 that engages web 15*a* and a second end 122 with a hook 124 thereon for receiving a loop end 200 on a stub linkage 202 of a type disclosed in U.S. patent application Ser. No. 10/323,321 filed Dec. 18, 2002. Lever 116 has a projection 126 located between hook 124 and the first end 118, a notch 128 that is perpendicular to a longitudinal axis of the lever 116 and located on an edge 130 of the projection 126, and a detent 132 on a surface of the hook 124. The detent 132 is connected by a slot 134 to a hole 136 located between the hook 124 and the first end 118. The slot 134 has a ramp 135 that extends from the detent 132 to the hole 136, see FIG. 5.

The actuator mechanism 100 includes a clip 140 as best shown in FIG. 6. Clip 140 is a wire formed member and is characterized by a first portion or segment 142 that is shaped to define a first spacer 144 that is initially located in notch 128 of lever 116, a second portion or segment 146, that extends from the first spacer 144, that is shaped to define a first arm 148 with a lip 150 on the end thereof, the end length of the arm 148 is equal to a length between the notch 128 and detent 132 on lever 116 and a third portion or segment 152 that extends from the first spacer 144 that is shaped to define a second arm. The second arm or third portion or segment 152 is characterized by extending from the first spacer 144 a first distance along a first plane to define a first base 154; from the first base 154 along a first angle α a second distance to define a first guide 156; from the first guide 156 along a second plane perpendicular to the first guide 156 a third distance to define a second spacer 158; from the second spacer 158 back along a second plane parallel with the first plane from the second spacer 158 a distance equal to the second distance to define a second guide 160; and from the second guide 158 a fourth distance along an angle α, complementary to the first angle α in the second plane from the second guide 160 to define a second base 162. The first base 154 and the second base 162 and the first guide surface 156 and second guide surface 160 are respectively located in parallel planes with each other while the first arm 148 is located along a plane defined by an angle β with respect to the first 154 and second 162 bases. The first spacer 144 is located on notch 128 of lever 116 such that the first base 154 and first guide 156 and second guide 160 and second base 162 are positioned in parallel alignment with the sides 105*a* and 105*b* of housing 104 as illustrated in FIG. 3.

To assist in maintaining an actuator lever 116 in parallel alignment with the side walls 105*a* and 105*b* of housing 104, clip 140 was modified as illustrated in FIG. 6*a* to define a clip 240. The width of the first spacer 244 of clip 240 is narrowed to be equal to the thickness of lever 116 while the first base 254 is bent such into segments 251, 253 and 255 such that the first spacer 244 and segment 253 is equal width to the second spacer 258. That portion 251 of the first base 254 and arm 248 engage the sides of projection 126 of lever 116 and help maintain hook 124 of lever 116 in the axial center of cavity 109.

Mode of Assembly of the Actuator Mechanism

The actuator mechanism 100 essentially consists of housing 104, lever 116 and clip 140. Housing 104 is characterized by a stamped member having a base 117 with parallel first 105*a* and 105*b* side walls with ends 102*a* and 102*b* that are separated to define a first end 102 and ends 106*a* and 106*b* that engage each other to define a second end 106. The first ends 102*a* and 102*b* each have a notch 103 therein for receiving web 15 of the first brake shoe 14 while the second ends 106*a* and 106*b* each have a notch 107 for receiving web 13 of the second brake shoe 12. Lever 116 is attached to housing 104 by a pin 108 such that hook 124 is located in a cavity 109 formed between the side walls 105*a* and 105*b*. Clip 140 is attached to lever 116 with the first spacer 144 located in notch 128 and lip 150 on the first arm 148 located in detent 132. The lever 116 is now moved into cavity 109 in housing 104 where the first base 154 and second base 162 are in parallel alignment base 107 as shown in FIG. 2. The actuator mechanism 100 is positioned between the first brake shoe 12 and the second brake shoe 14 with notch 103 engaging web 15*a* and notch 107 engaging web 13*a*. After springs 48 and 51 are attached to brake shoes 12 and 14, shoulder 120 on lever 116 also engages the web 15*a*.

Under most conditions, it is desirable to connect a stub linkage 202 to the actuation mechanism 100 to complete the manufacture of a drum-in-hat brake 10 which is later installed on a vehicles. The stub linkage 202 may be similar to that disclosed in U.S. patent application Ser. No. 10/323, 321 wherein a loop end 200 is located on the end of a stranded cable member.

Figure 8:
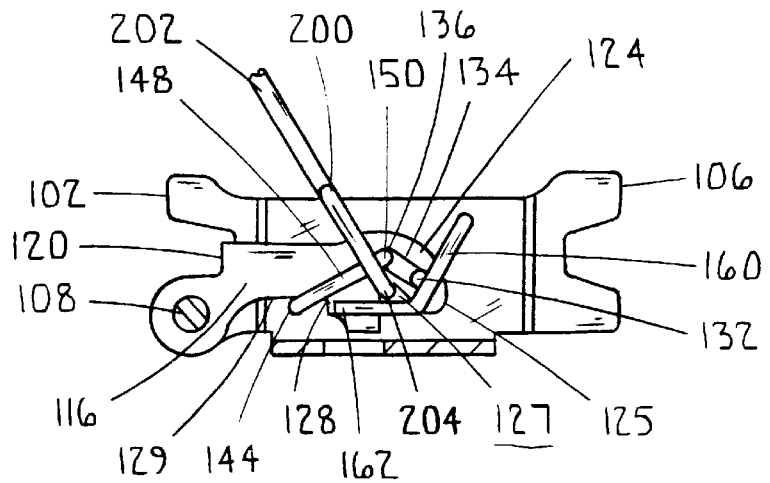
FIG. 8 is a sectional view showing the completion of the attachment of the loop end of the cable with the hook in FIG. 7.
Figure 7:
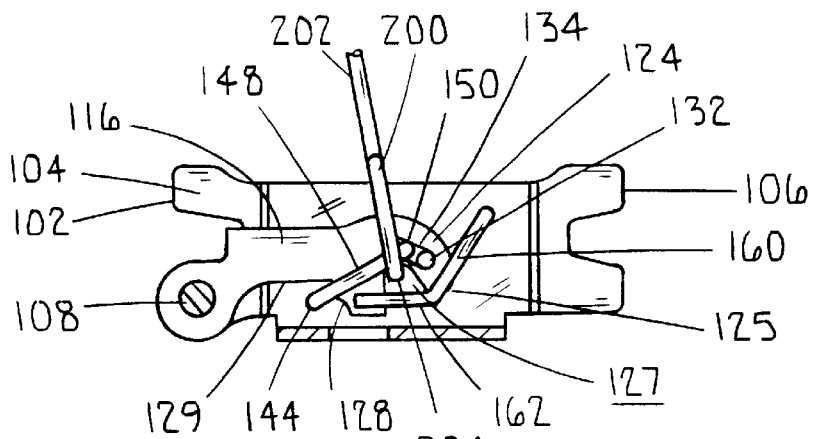
FIG. 7 is a sectional view showing a functional relationship between a end loop on a cable and the hook of the lever during the attachment of a cable to the lever of FIG. 2.
Figure 9:
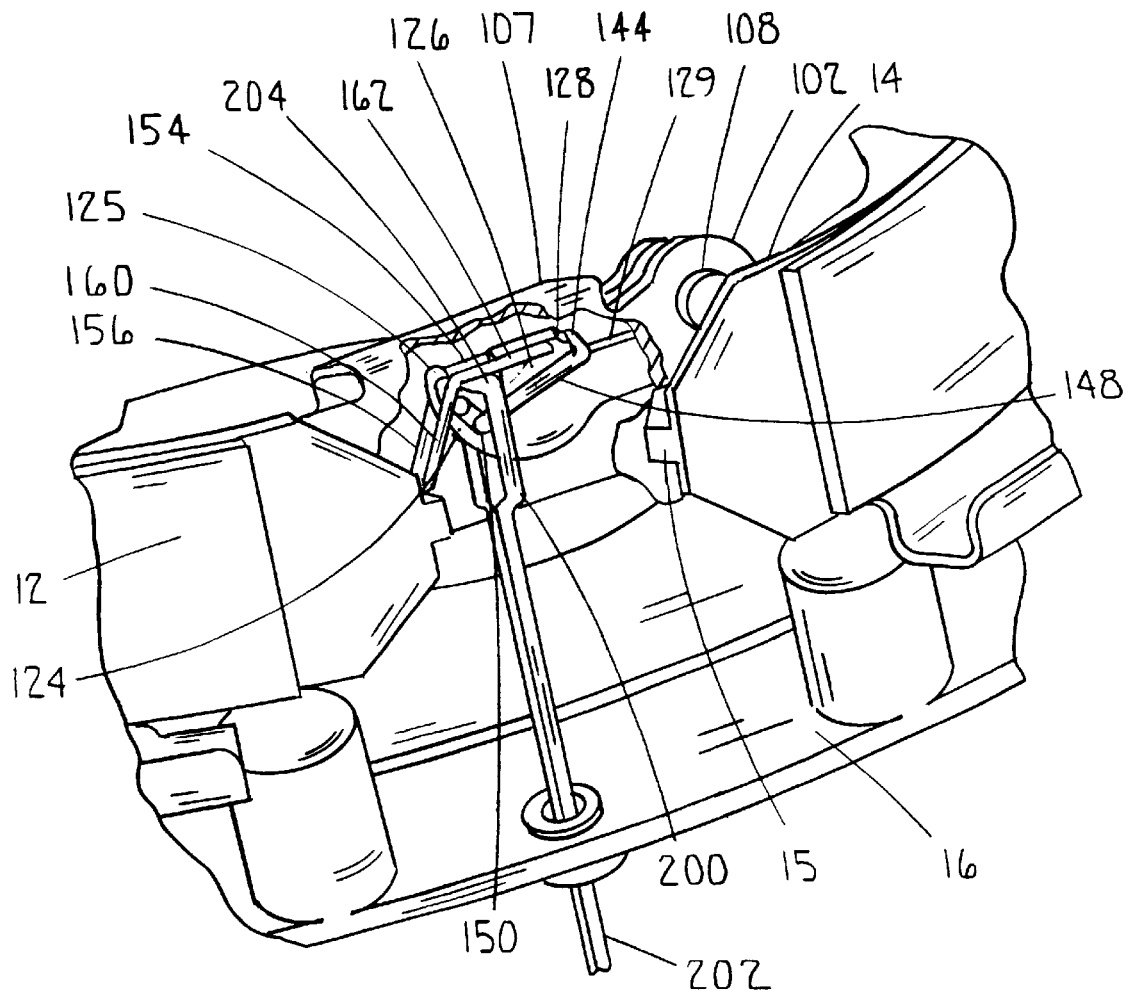
FIG. 9 is an enlarged perspective view of a portion of the drum-in-hat brake of FIG. 1 wherein the housing for actuator mechanism has been cut away to show the relationship of the lever and clip member when installed in a drum-in-hat brake.

The attachment of the stub linkage 202 to lever 116 is achieved by pushing loop end 200 into cavity 109 of housing 104 of the actuation mechanism 100 until a face 204 on loop end 200 engages the first 156 and second 160 guides on clip 140. The guides 156 and 160 direct the face 204 around tip 125 of hook 124 and into alignment with throat 127 such that hook 124 is now located in the loop end 200, see FIG. 7. Thereafter, the pushing force applied to the stub linkage 202 is now reversed and a pulling force is communicated to the loop end 200 to bring loop end 200 into engagement with the first arm 148. The pulling force as applied through the loop end 200 to arm 148 moves lip 150 moves out of detent 132 such that lip 150 slides along ramp 135 of slot 134 and also moves the first spacer 144 out of notch 128. When loop end 200 reaches the bottom of throat 127 in hook 124, lip 150 snaps into hole 136 and the first spacer 144 is located on ledge 129 of lever 116 such that the first base 154 and second base 162 of the third segment 152 of clip 140 covers hook 124 to retain loop end 200 in the throat 127 as illustrated in FIGS. 8 and 9. The attachment of the stub linkage 202 to lever 116 is usually a last step in the assembly of a drum-in-hat brake 10. The drum-in-hat brake 10 is shipped to a vehicle manufacture where it is attached to a vehicle and the stub linkage 202 is connected to a park brake actuation cable.

Figure 10:
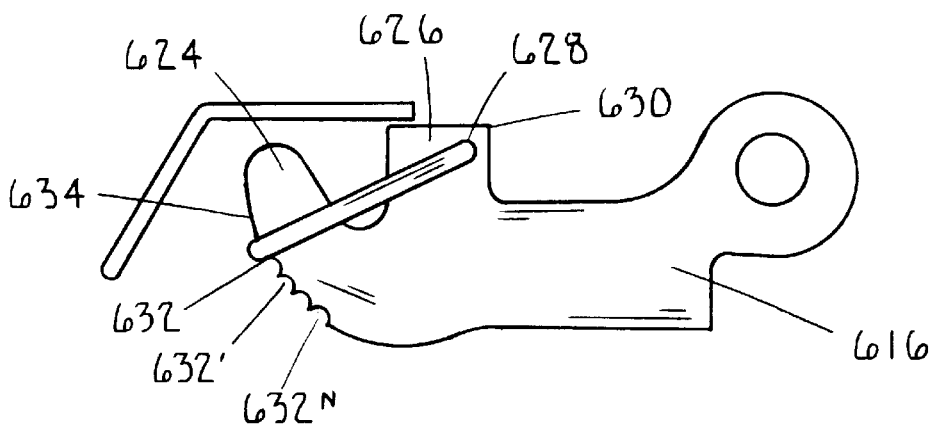
FIG. 10 is a sectional view of a second embodiment of the actuator mechanism according to the present invention.

FIG. 10 illustrates a second embodiment of a lever 616 for an actuator mechanism 100. Lever 616 is very similar to lever 116 and thus only the changes are herein described in detail. The lever 616 has a first detent or hole 628 on or near the peripheral surface 630 of projection 626 and a plurality of detents or notches 632,632' . . . 632" that are located on the peripheral surface 634 on hook 624. The first spacer 144 on clip 140 is located in hole 628 and lip 150 located in the first notch 632 such that the first 154 and second 162 bases and first 156 and second 160 guides of clip 140 are aligned in housing 104 in a manner as shown in FIG. 2. When loop end 200 engages the first arm 148 of clip 140, the first base 144 remains stationary and the first arm 148 pivots about hole 628 as lip 150 is ratchet toward notch 632". When the force as applied to the stub linkage 202 moves loop end 200 into engagement with the bottom of throat 127, lip 150 will be located in notch 632" and the first 154 and second 162 bases in conjunction with the first 156 and second 160 guides will have rotated to close throat 627 in a manner similar to that illustrated in FIGS. 8 and 9 such that loop end 200 is retained within the hook 624.

Mode of Operation

To initiate a parking brake application, an input force is communicated by a park brake cable that pulls on loop end 200 to apply an actuation force to the hook 124 of lever 116. The actuation force causes lever 116 to pivot on pin 108 and produce an expanding force in the actuator mechanism 100. The expanding force is characterized by a first force that is communicated through end 106 into web 13 and a second force that is communicated through the shoulder 120 on the lever 116 into web 15. The expanding force moves the first 12 and second 14 brake shoes toward surface 45 on drum 46 and when the friction pads 42 and 44 contact surface 45 on drum 46 frictional engagement occurs. The frictional engagement is a direct function of the input force applied to the second end of the park brake cable and is designed to hold the brake drum 46 stationary with respect to the vehicle.

When the operator desires to terminate the parking brake application, the input force applied to the park brake is terminated such that return springs 48 and 51 act on webs 13,15 to move the friction pads 42,44 away from engagement surface 45 and return to their running clearance position.

I claim:
1. An actuator mechanism in a drum-in-hat park brake for use in a vehicle, said park brake including a first brake shoe and a second brake shoe that are respectively retained on a backing plate secured to said vehicle, said first brake shoe and said second brake shoe each having a first web with a first engagement end and a second engagement end, said first engagement end of each of said first and second webs being aligned with an anchor while said second engagement end of each of said first and second webs are spaced apart by said actuator mechanism, spring means attached to said first and second webs for urging said first and second webs toward said anchor and said actuator mechanism, said actuator mechanism including a housing with a first end that engages said first web and a second end that engages said second web, a lever that is pivotally retained in said housing and connected by linkage to an input member, said lever having a first end that engages said first web and a second end with a hook thereon for receiving a loop end of said linkage, said linkage communicating an input force from an operator that causes said lever to pivot and exert an actuation force to said first and second webs that correspondingly move first and second friction members associated with said first and second brake shoes into engagement with a drum to effect a brake application, said actuator mechanism being further characterized in that said lever has a projection located between said hook and said first end, a notch that is perpendicular to a longitudinal axis of said lever and located on an edge of said projection, and a detent on a surface of said hook that is connected by a slot to a hole located between said hook and said first end and in that a clip member having a first portion initially located in said notch and a second portion initially located in said detent responds to an initial input force applied by said loop to said second portion moves a lip on said second portion from said detent along said slot and into said hole while said first portion correspondingly moves out of said notch and a third portion of said clip is aligned with said hook such that said loop is retained in said hook.

2. The actuator mechanism as recited in claim 1 wherein said clip is further characterized in that said first portion is a first spacer located in said notch, and in that said second portion is a first arm that extends from said first spacer and said lip is located on said first arm, and in that said third portion is a second arm that extends from said first spacer a first distance along a first plane to define a first base and along a first angle from said first base a second distance to define a first guide and along a second plane perpendicular to said first guide a third distance to define a second spacer and back along a second plane parallel with said first plane from said second spacer said second distance to define a second guide and along a complementary angle to said first angle in said second plane from said second guide a fourth distance to define a second base, said loop on said linkage on being installed in said housing first engaging said first and second guides and being directed toward a throat for said hook and on said initial input force being applied to said linkage moving said loop into engagement with said first arm such that on further movement of said loop toward a bottom surface of the throat said lip moves from said detent along said slot into said hole while said first spacer moves out of said notch and said first and second bases move past a tip on the end of said hook to retain said loop in said hook.

3. The actuator mechanism as recited in claim 2 wherein said slot is further characterized by a ramp that extends from said detent to said hole and when said loop reaches said the bottom surface on said throat said lip snaps into said hole.

4. The actuator mechanism as recited in claim 3 wherein said clip is further characterized in that said first and second guides assist in maintaining said lever in axial alignment between said first and seconds webs.

5. The actuator mechanism as recited in claim 2 wherein said lever is further characterized in that movement of said lip from said detent and movement of said first spacer simultaneously occur as said loop moves toward the bottom of said throat.

6. The actuator mechanism as recited in claim 2 wherein said slot is further characterized by a ramp connected to said detent such that said lip moves out of said detent on movement of said first arm into said slot and said slot guides said lip toward and into said hole as said loop moves toward the bottom of said throat.

7. An actuator mechanism in a drum-in-hat park brake for use in a vehicle, said park brake including a first brake shoe and a second brake shoe that are respectively retained on a backing plate secured to said vehicle, said first brake shoe and said second brake shoe each having a first web with a first engagement end and a second engagement end, said first engagement end of each of said first and second webs being aligned with an anchor while said second engagement end of each of said first and second webs are spaced apart by said actuator mechanism, spring means attached to said first and second webs for urging said first and second webs toward said anchor and said actuator mechanism, said actuator mechanism including a housing with a first end that engages said first web and a second end that engages said second web, a lever that is pivotally retained in said housing and connected by linkage to an input member, said lever having a first end that engages said first web and a second end with a hook thereon for receiving a loop end of said linkage, said linkage communicating an input force from an operator that causes said lever to pivot and exert an actuation force that move said first and second webs and correspondingly first and second friction members associated with said first and second brake shoes into engagement with a drum to effect a brake application, said actuator mechanism being further characterized in that said lever has a projection located between said hook and said first end, a notch that is perpendicular to a longitudinal axis of said lever and located on an edge of said projection, and a plurality of detents in a surface of said hook, and in that a clip member has a first portion located in said notch, a second portion that extends from said first portion with a lip on arm initially located in a first detent of said plurality of detents and a third portion that extends from said first portion, said loop responding to an initial actuation force by acting on said arm and sequentially moving said lip from said first detent toward a last detent of said plurality of detents while said third portion of said clip member is aligned with said hook such that said loop is retained in a throat of said hook.

8. The actuator mechanism as recited in claim 7 wherein said clip is further characterized in that said first portion is a first spacer located in said notch, and said third portion is a second arm that extends from said first spacer a first distance along a first plane to define a first base and along a first angle from said first base a second distance to define a first guide and along a second plane perpendicular to said first guide a third distance to define a second spacer and back along a second plane parallel with said first plane from said second spacer said second distance to define a second guide and along a complementary angle with respect to said first angle in said second plane from said second guide a fourth distance to define a second base, said loop on said linkage on installation into said housing initially engaging said first and second guides and being directed toward said hook and on said initial input force being applied to said loop through said linkage engaging said first arm such that said lip moves from said first detent to a subsequent detent as said loop moves into said throat such that when said loop reaches a bottom of said throat said lip is located in a last detent in said plurality of detents and said first and second bases move past a tip on the end of said hook such that said loop is retained in said hook.

9. The actuator mechanism as recited in claim 8 wherein said clip is further characterized in that said first spacer pivot in said notch as said lip moves from said first detent to said last detent in said plurality of detents.

10. The actuator mechanism as recited in claim 9 wherein said clip is further characterized in that said first and second guides assist in maintaining said lever in axial alignment between said first and seconds webs.

11. The actuator mechanism as recited in claim 10 wherein said lever is further characterized in that movement of said lip from said first detent toward said last detent of said plurality of detents causes said first spacer to move out of said notch as said loop moves toward a bottom of the throat of said hook.

12. An actuator mechanism for a drum-in-hat park brake in a vehicle, said actuator mechanism having a housing with a first end that engages a first web of a first brake shoe and a second end that engages a second web of a second brake shoe and a lever that is pivotally retained in the housing, said lever having a first end that engages the first web and a second end with a hook thereon for receiving a loop end of a linkage connected to an input member, said linkage receiving an input force that causes said lever to pivot and exert an actuation force on the first and second webs to correspondingly move first and second friction members associated with the first and second brake shoes into engagement with a drum to effect a brake application, said actuator mechanism is characterized in that said lever has a projection located between the hook and the first end, a notch located on an edge of said projection that is perpendicular to a longitudinal axis of the lever, and a detent in a surface on said hook, and by a clip member having a first portion initially located in said notch, a second portion with a lip of an arm initially located in said detent and a third portion that extends from said first portion, said loop responding to an initial input force by moving into engagement with said arm and thereafter moving toward a bottom of a throat for said hook to correspondingly move said lip out of said detent and into a hole in said lever while at the same time said first portion moves out of said notch such that when the loop reaches said bottom of the throat of the hook said lip snaps into said hole and said third portion of the clip is aligned with a tip of the hook to retain said loop in the hook.

13. The actuator mechanism as recited in claim 12 wherein said clip is further characterized in that said first portion is a first spacer that is located in said notch, and in that said third portion is a second arm that extends from said first spacer a first distance along a first plane to define a first base and along a first angle from said first base a second distance to define a first guide and along a second plane perpendicular to said first guide a third distance to define a second spacer and back along a second plane parallel with said first plane from said second spacer said second distance to define a second guide and along a complementary angle to said first angle in said second plane from said second guide a fourth distance to define a second base, said loop on said linkage on being installed in said housing first engaging said first and second guides and being directed toward a throat for said hook and on said initial input force being applied to said linkage moving said loop into engagement with said first arm such that on further movement of said loop toward a bottom surface of the throat said lip moves from said detent along said slot into said hole while said first spacer moves out of said notch and said first and second bases move past a tip on the end of said hook to retain said loop in said hook.

14. The actuator mechanism as recited in claim 13 wherein said lever is further characterized by slot that extends from said detent to said hole and when said loop reaches said the bottom surface on said throat said lip snaps into said hole.

15. The actuator mechanism as recited in claim 14 wherein said slot is further characterized by a ramp that extends from said detent to said hole.

* * * * *